(12) United States Patent
Pirner et al.

(10) Patent No.: US 6,422,707 B2
(45) Date of Patent: Jul. 23, 2002

(54) EXTERIOR REARVIEW MIRROR FOR VEHICLES, IN PARTICULAR, FOR MOTOR VEHICLES

(75) Inventors: Alexander Pirner, Esslingen; Florin Secanu, Nürtingen, both of (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/849,891

(22) Filed: May 4, 2001

(30) Foreign Application Priority Data

May 9, 2000 (DE) .......................... 100 22 448

(51) Int. Cl.[7] .............................................. G02B 7/182
(52) U.S. Cl. ...................... 359/872; 359/871; 359/873; 359/838
(58) Field of Search ................................. 359/872, 871, 359/873, 838, 849, 850, 876, 879, 841, 877; 248/549, 476, 477, 478, 479, 475.2, 483

(56) References Cited

U.S. PATENT DOCUMENTS

| 4,129,365 A | * | 12/1978 | Aversano et al. ............ 353/99 |
| 4,168,635 A | * | 9/1979 | Savidan .................... 74/501 M |
| 4,951,912 A | * | 8/1990 | Manzoni .................. 248/475.1 |
| 5,940,230 A | * | 8/1999 | Crandall ..................... 359/841 |
| 6,227,675 B1 | * | 5/2001 | Mertens et al. ............. 359/871 |
| 6,234,637 B1 | * | 5/2001 | Juraschek ................... 359/871 |

\* cited by examiner

Primary Examiner—Mohammad Sikder
(74) Attorney, Agent, or Firm—Gudrun E. Huckett

(57) ABSTRACT

An exterior rearview mirror for vehicles has a mirror base and a mirror head connected to the mirror base so as to be pivotable in a travel direction of the vehicle and in a direction opposite to the travel direction. The mirror base has first and second bearings and the mirror head has first and second bearing elements engaging the first and second bearings, respectively. The first and second bearing elements are configured such that, when the mirror head pivots in the travel direction, the first bearing elements disengage the first bearings and the second bearing elements form a pivot axis within the second bearings and, when the mirror head pivots in the direction opposite the travel direction, the second bearing elements disengage the second bearings and the first bearing elements form a pivot axis within the first bearings.

25 Claims, 6 Drawing Sheets

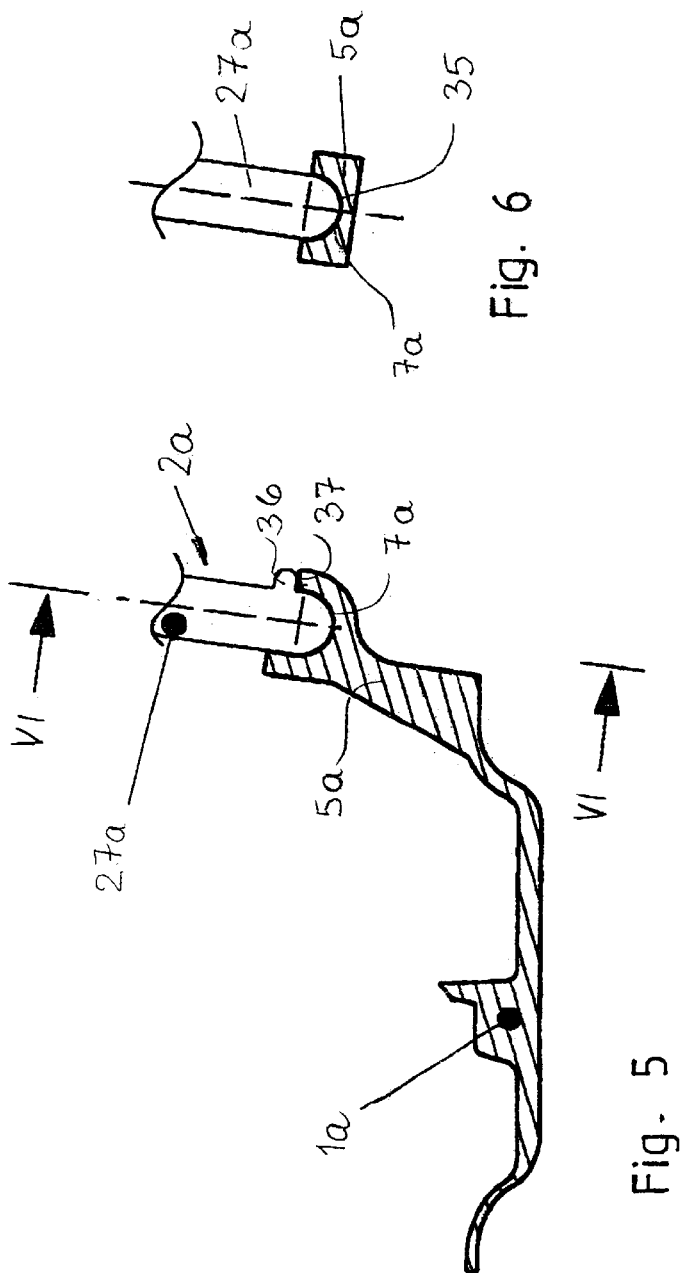

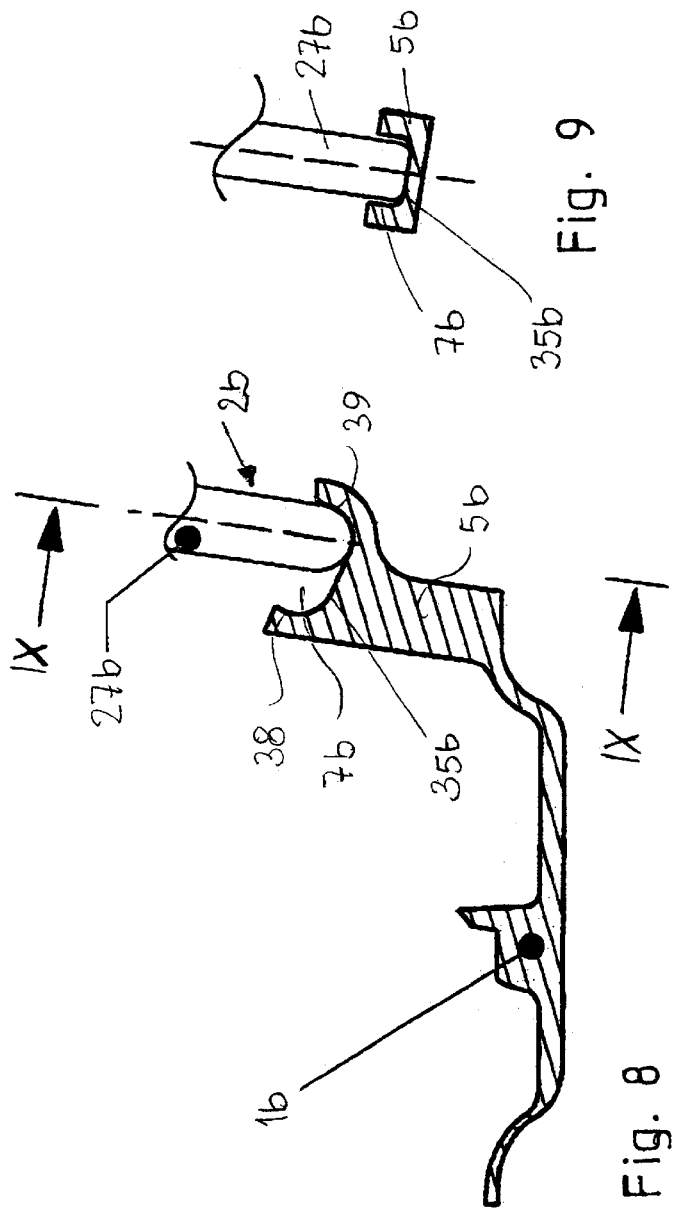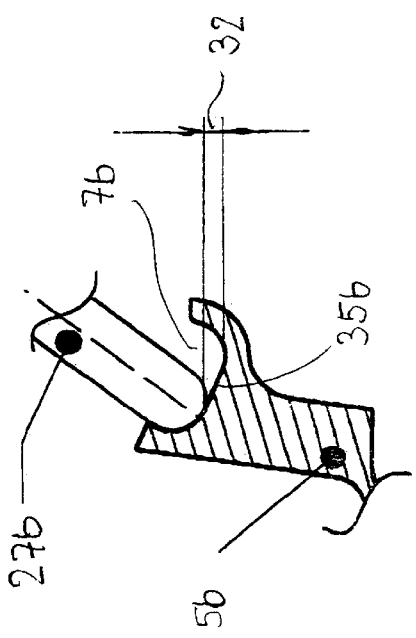

EXTERIOR REARVIEW MIRROR FOR VEHICLES, IN PARTICULAR, FOR MOTOR VEHICLES

BACKGROUND OF THE INVENTION

1. Field of the Invention

The invention relates to an exterior rearview mirror for vehicles, in particular, for motor vehicles, comprising a mirror base and a mirror head which is pivotable in the travel direction of the vehicle as well as opposite to the travel direction of the vehicle relative to the mirror base.

2. Description of the Related Art

In known exterior rearview mirrors, the mirror head can be pivoted counter to the travel direction of the motor vehicle into a parking position. Moreover, the mirror head can be pivoted also forwardly in the travel direction when impacted. In order to make possible these two pivot movements, the mirror carrier of the mirror head is connected by an intermediate joint to the mirror base. This intermediate joint has two joint axles with which it is connected pivotably with the mirror base as well as with the mirror carrier of the mirror head. The exterior rearview mirror has a complex configuration because of the intermediate joint. Moreover, the assembly of the exterior rearview mirror is made more complicated as a result of the intermediate joint and is thus more expensive.

SUMMARY OF THE INVENTION

It is an object of the present invention to configure an exterior rearview mirror of the aforementioned kind such that it provides a simple and inexpensive assembly while having a simple constructive configuration.

In accordance with the present invention, this is achieved in that the mirror base is provided with bearings engaged by the mirror head by means of bearing elements, wherein, depending on the pivot direction of the mirror head, first bearing elements disengage from the bearings while the other bearing elements form the pivot axles for the mirror head within the bearings.

The mirror head of the exterior rearview mirror according to the invention is directly pivotably connected with the mirror base. The mirror base is provided with the bearings which are engaged by the bearing elements of the mirror head. As a result of this configuration, the exterior rearview mirror according to the invention has a constructively very simple configuration. Since an intermediate joint, as required in the exterior rearview mirrors of the prior art, is eliminated, the exterior rearview mirror according to the invention can be assembled in a simple and inexpensive way.

BRIEF DESCRIPTION OF THE DRAWING

In the drawing:

FIG. 5 is a section of a part of a second embodiment of the exterior rearview mirror according to the invention;

FIG. 6 is a section along the line VI—VI of FIG. 5;

FIG. 7 is a part of the exterior rearview mirror according to the invention of FIG. 5, whose mirror head is pivoted relative to the mirror base;

FIG. 8 is a section of a part of a third embodiment of the exterior rearview mirror according to the invention;

FIG. 9 is a section along the line IX—IX of FIG. 8; and

FIG. 10 is a part of the exterior rearview mirror according to the invention of FIG. 8, whose mirror head is pivoted relative to the mirror base.

DESCRIPTION OF THE PREFERRED EMBODIMENTS

The exterior rearview mirror is fastened in a manner known in the art to a mirror base 1 on the motor vehicle K. A mirror head 2 is supported on the mirror base 1 and can be folded in and counter to the travel direction F (FIG. 3) of the motor vehicle relative to the mirror base 1. The mirror head 2 is pivoted counter to the travel direction F into a parking position in which the mirror head 2 is positioned closely adjacent to the longitudinal side of the motor vehicle. The mirror head 2 is folded in the travel direction F forwardly when impacted in order to prevent a risk of injury in this way.

Figure 3:
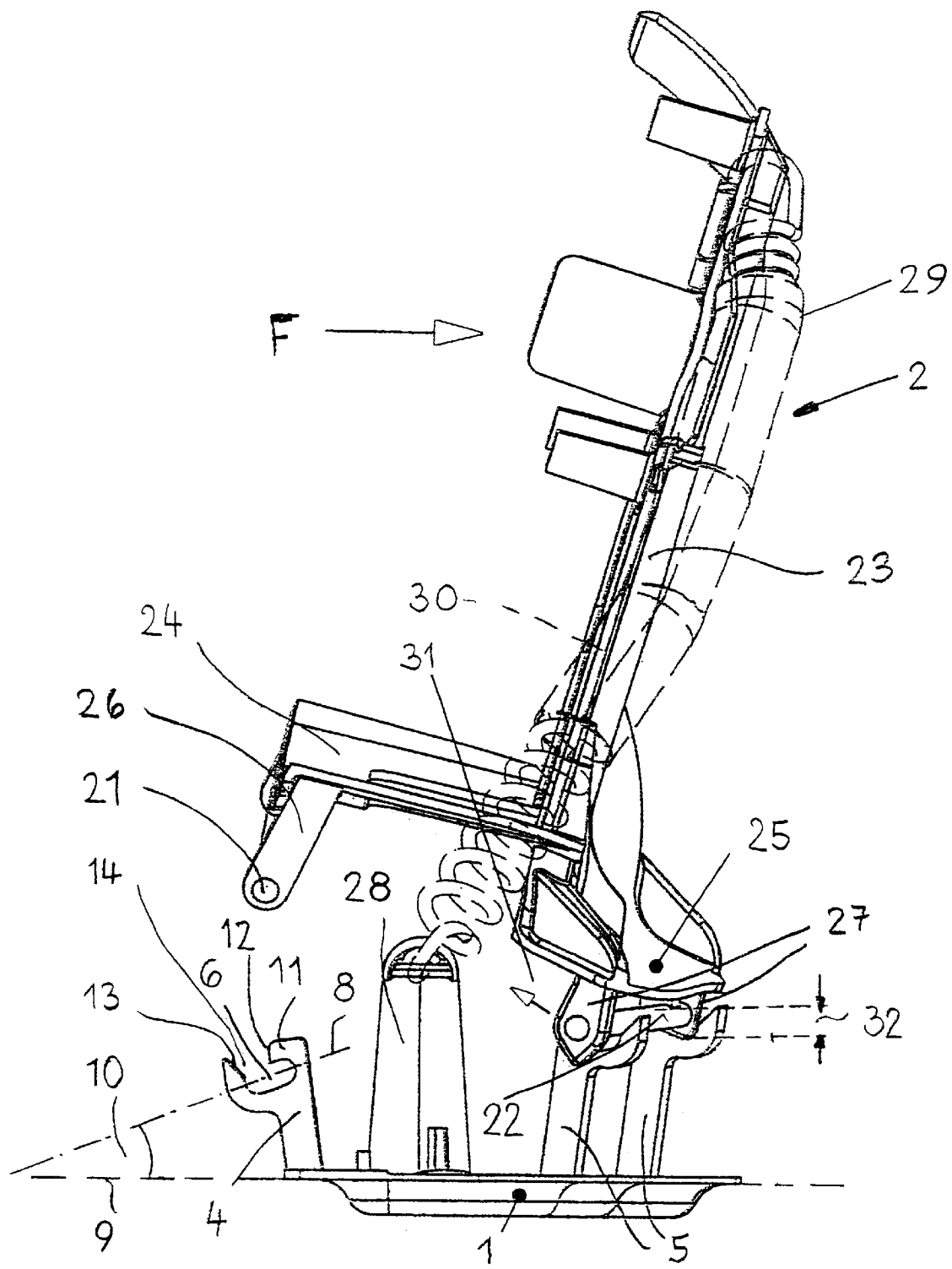
FIG. 3 shows the exterior rearview mirror according to the invention with the mirror head pivoted forwardly in the travel direction.

The mirror base 1 has a mirror base plate 3 with which the mirror base 1 rests against the motor vehicle. The mirror base plate 3 is screwed in a manner known in the art onto the motor vehicle. Two pivot brackets 4, 5 each project from the mirror base plate 3 on which the mirror head 2 is supported in a way to be described in the following. The pivot brackets 4, of which only one is illustrated in the drawings, are provided at the rearward part of the mirror base plate 3, viewed in the travel direction F, while the pivot brackets 5 are arranged on the forward area of the mirror base plate 3, viewed in the travel direction F. The pivot brackets 4 and 5 extend divergingly upwardly away from the mirror base plates 3. On their free end, the pivot brackets 4, 5 are provided with a receptacle 6, 7, respectively (FIGS. 3 and 4), which are of identical configuration, respectively. As illustrated in FIG. 3 for the receptacle 6 of the pivot brackets 4, the receptacle 6 is formed as an elongate bearing opening whose axis 8 defines, together with a vertical plane 9 positioned in the travel direction F, an acute angle 10 which opens in the travel direction F. In the shown embodiment the angle is approximately 20°.

The receptacle 6 is covered at its forward end, viewed in the travel direction F, by a nose 11 which is advantageously a monolithic part of the respective pivot bracket 4. The nose 11 has an end face 12 which together with the oppositely positioned end face 13 defines an insertion opening 14 which opens into the receptacle 6. The two end faces 12, 13 converge in the direction toward the receptacle 6.

The receptacles 7 of the two pivot brackets 5 are of a configuration identical to that of the receptacles 6. Their axes 15 (FIG. 4) also form an acute angle 16 with the vertical plane 9 which angle opens in a direction opposite the travel direction F. The receptacles 7 are also partially delimited by a nose 17 whose end faces 18 together with the oppositely positioned end faces 19 delimit an insertion opening 20 which opens into the receptacles 7. The end faces 18, 19 converge in the direction toward the receptacles 7.

The noses 11, 17 are provided at the facing sides of the pivot brackets 4, 5. They prevent that the mirror head 2 will become completely detached from the mirror base 1 during the respective folding movements.

Axles 21, 22 of the mirror head 2 engage the receptacles 6, 7 of the pivot brackets 4, 5. The axle 21 is positioned perpendicularly to the travel direction F while the axle 22 is positioned at a slant forwardly and downwardly in the travel direction F. Accordingly, the pivot brackets 4, when viewed perpendicularly to the travel direction F, are also positioned at a spacing above one another, while the pivot brackets 5, viewed in the travel direction F, are positioned at a spacing above one another and staggered relative to one another in the travel direction F.

The mirror head 2 has a mirror carrier 23 on which a mirror glass (not illustrated), a mirror glass support plate as well as a drive for the mirror glass support plate are supported. At the end facing the mirror base 1, the mirror carrier 23 has two transversely projecting carrier parts 24, 25 with two bracket members 26, 27 projecting therefrom, respectively, in the direction toward the mirror base 1. At the free ends of the bracket members 26, 27, the ends of the axles 21, 22 are fastened. The spacing of the bracket members 26, 27 from one another is greater than the spacing of the pivot brackets 4, 5 so that the bracket members 26, 27 in the position of use (FIG. 2) are positioned adjacent to the pivot brackets 4, 5.

Figure 1:
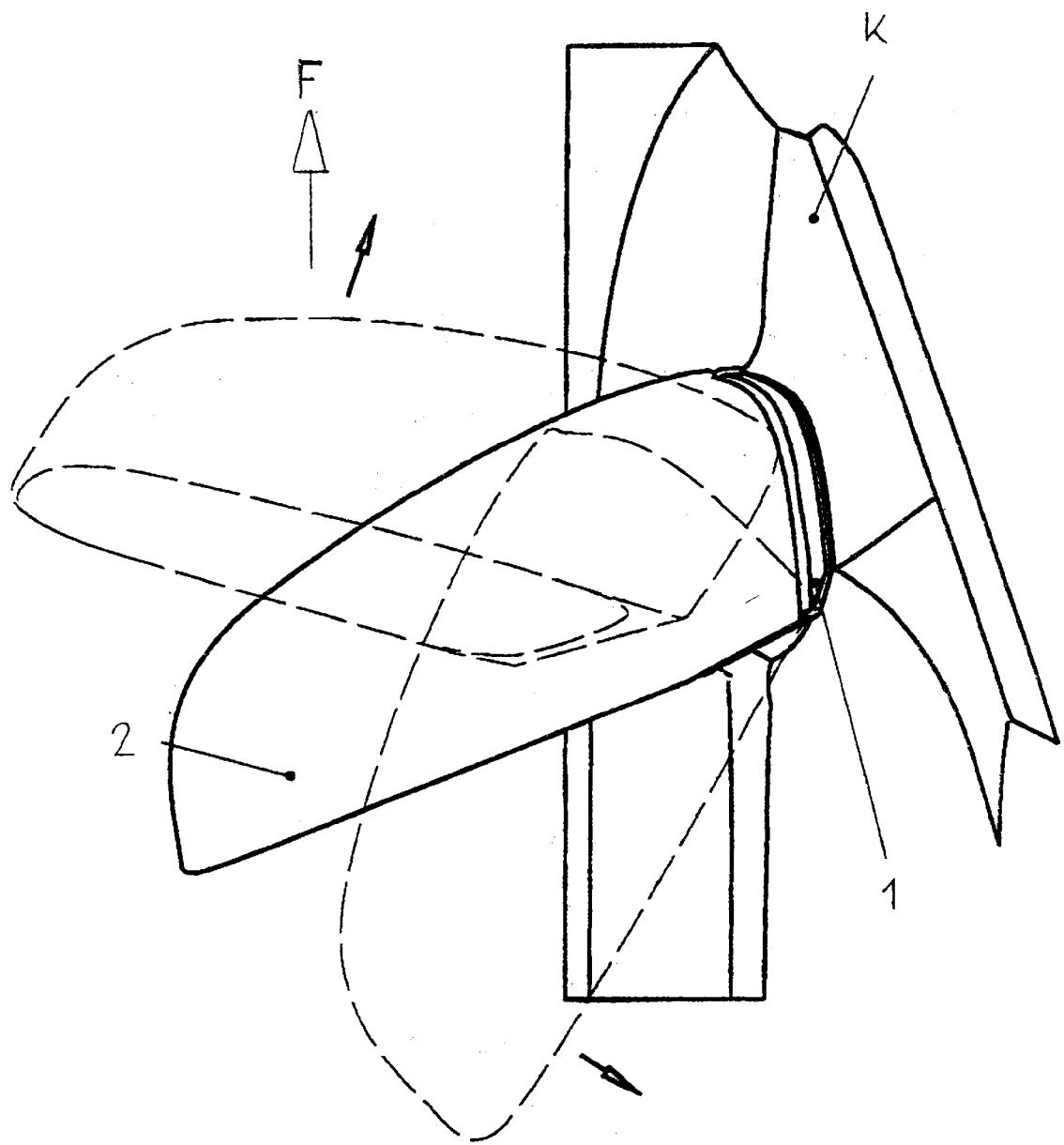
FIG. 1 is a simplified illustration of an exterior rearview mirror according to the invention.
Figure 2:
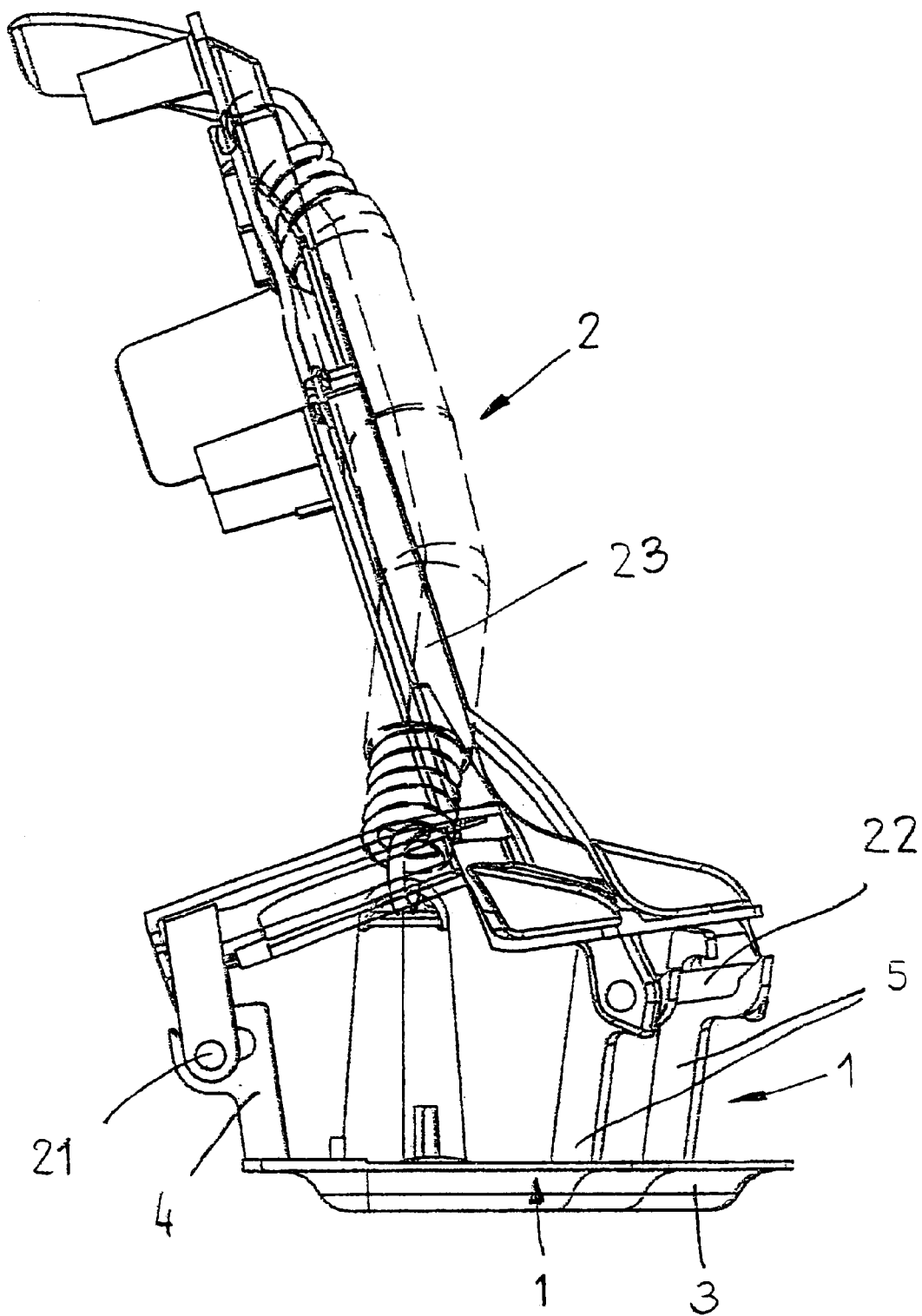
FIG. 2 shows the exterior rearview mirror according to the invention without cover in the position of use.

An arm 28 projects from the mirror base plate 3 in the direction toward the mirror head 2, and one end of a tension spring 29 is connected to its free end. The other end of the spring 29 is fastened to the end of the mirror carrier 23 facing away from the mirror base 1. The tension spring 29 extends at the front side of the mirror carrier 23, relative to the travel direction F, in a manner known in the art and projects through an opening 30 in the mirror carrier 23 to its opposed side. As a result of the force of the tension spring 29, the mirror head 2 is pulled fixedly against the mirror base 1 in the position of use according to FIG. 2. The two axles 21, 22 of the mirror head 2 are positioned in the receptacles 6, 7 of the pivot brackets 4, 5. As illustrated in FIG. 2, the axles 21, 22 rests against the ends of the receptacles 6, 7 facing away from one another. Accordingly, the axles 21,22 are at the level of the insertion openings 14, 20 of the receptacles 6, 7.

When the mirror head 2 is impacted in the travel direction F, it pivots about the axle 22 against the force of the tension spring 29 (FIG. 3). This pivot action causes the axle 21 to move through the insertion openings 14 of the receptacles 6 in the outward direction. At the same time, the axle 22 in the receptacles 7 is moved within the receptacles 7 to such an extent that the axle 22 comes to rest against the end of the receptacles 7 covered by the noses 17. Since the axes 15 of these receptacles 7 are slanted counter to the travel direction F at the angle 16 relative to the vertical plane 9 (FIG. 4), the mirror head 2 is not only forwardly folded in the travel direction F during this folding movement but at the same time is also moved away from the mirror base 1. As a result of the slanted position of the receptacles 7, the axle 22 performs a stroke 32 during this folding movement. This has the result that the cover surrounding the mirror carrier 23 is moved by this folding movement away from the mirror base 1 by the stroke 32. This reliably prevents damage of the generally painted cover during this folding action.

As soon as the force effect on the mirror head 2 has stopped, the mirror head is moved by the tension spring 29 back into the position of use according to FIG. 2. When doing so, the axle 22 in the receptacles 7 is moved back again, while the oppositely positioned axle 21 of the mirror head 2 is moved via the insertion openings 14 into the receptacles 6. As a result of the insertion openings 14 being tapered conically in the direction toward the receptacles 6, the axle 21 will reliably reach the receptacles 6.

When the mirror head 2 is pivoted counter to the travel direction F into the parking position, it is pivoted about the axle 21. The oppositely positioned axle 22 moves outwardly via the insertion openings 20 of the receptacles 7. During the pivot movement of the mirror head 2, the axle 21 in the receptacles 6 is moved forwardly in the travel direction F and at a slant outwardly corresponding to the angle 10 defined between the receptacles 6 and the vertical plane 9. As a result of this movement 33 oriented outwardly at a slant and forwardly in the travel direction F, the cover of the mirror head 2 is also moved away from the mirror base 1 by the stroke 34 as a result of the pivot movement so that damage of the cover is reliably prevented. The axle 21 rests against the end of the receptacles 6 covered by the noses 11 so that the mirror head 2 can be pivoted perfectly into the parking position. This adjustment of the mirror head 2 is carried out preferably by a motor in a manner known in the art.

When the mirror head 2 is pivoted back from the parking position into the position of use according to FIG. 2, the axle 22 reaches via the insertion openings 20 reliably the receptacles 7 of the pivot brackets 5. At the same time, the axle 21 is moved within the receptacles 6 to the opposite end. This causes the mirror head 2 to be moved by the length of the stroke 34 again in the direction toward the mirror base 1.

FIGS. 5 through 7 show a second embodiment of an exterior rearview mirror in which the stroke during folding of the mirror head in and counter to the travel direction of the vehicle is realized by a differently designed lifting device. The mirror head 1a has again pivot brackets of which only one pivot bracket 5a is illustrated in FIGS. 5 through 7. The other pivot brackets are of an identical configuration. The pivot bracket 5a is provided at the free end with the receptacle 7a which is embodied as a spherical socket. The bracket member 27a of the mirror carrier of the mirror head 2a engages the receptacle 7a. The free end of the bracket member 27a is spherically configured and rests areally on the spherically shaped bottom 35 of the receptacle 7a. A projection 36 projects transversely from the bracket member 27a and rests on an end face 37 of the bracket member 5a in the position of use of the mirror head 2a (FIG. 5).

Figure 4:
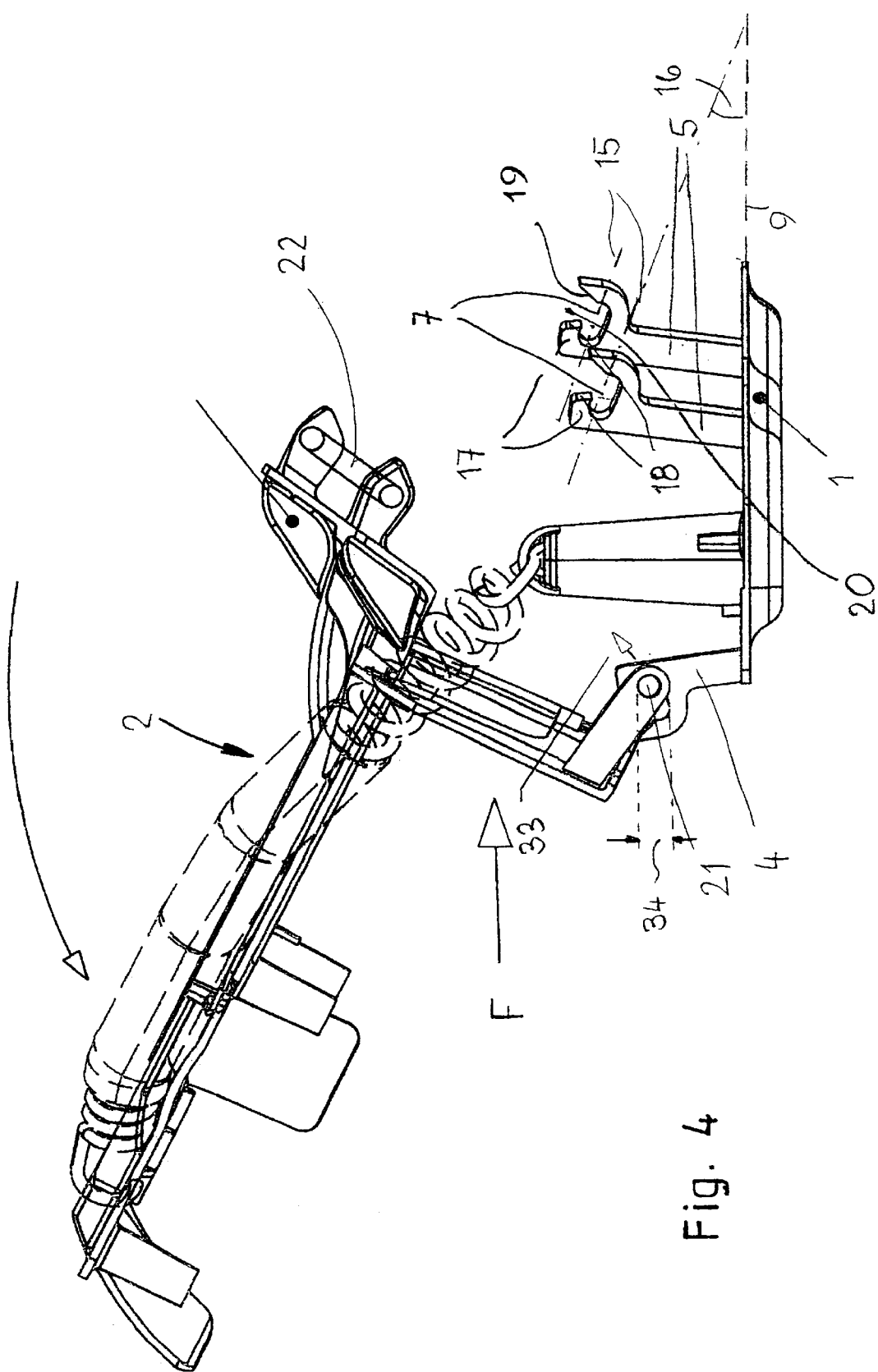
FIG. 4 shows the exterior rearview mirror with the mirror head pivoted to the rear relative to the travel direction.

When the mirror head, as described in detail with the aid of the previous embodiment, is forwardly folded in the travel direction F of the vehicle, for example, by an impact, the bracket members 27a of the mirror carrier pivot forwardly in the travel direction F within the receptacles 7a. Since the bracket members 27a are supported with the projections 36 on the end faces 37 of the pivot brackets 5a, the bracket members 27a are lifted simultaneously off the bottom 35 of the receptacles 7a during the pivot action (FIG. 7). This again has the result that the mirror carrier and thus the mirror head 2a are lifted by the stroke 32 away from the mirror base 1a. The end face of the projections 36 is rounded so that this stroke of the mirror head 2 can be carried out without problems. This pivot movement causes the oppositely positioned bracket members (not illustrated) of the mirror head to disengage from the pivot brackets of the mirror base 1a. As soon as the force action on the mirror head 2a has ended, the mirror head pivots back into the position of use according to FIGS. 5 and 6 under the force of the tension spring 29 (FIGS. 2 through 4). When doing so, the mirror head 2a is returned during the pivot movement by the stroke 32 in the direction toward the mirror base 1a. The receptacles 7a are so long that the bracket members 27a of the mirror head 2a in any pivot position engage the receptacles 7a so that the mirror head 2a can be reliably pivoted.

The stroke of the mirror head 2a is carried out in the same way, when the mirror head is pivoted counter to the travel direction F into the parking position. In this case, the oppositely positioned bracket members, not shown in FIGS. 5 through 7, will pivot in the receptacles 6 of the pivot brackets 4. These bracket members 26 are provided with projections 36 so that the mirror head 2 can be lifted by the stroke 34 (FIG. 4) off the mirror base during the pivot movement. When doing so, the bracket members 27a disengage the receptacles 7a of the pivot brackets 5a. When the mirror head 2a is pivoted out of the parking position back into the position of use according to FIGS. 5 and 6, the mirror head 2a is guided by the stroke 34 back to the mirror base 1 a. The bracket members 27a of the mirror head 2a reliably reach the receptacles 7a of the pivot brackets 5a of the mirror base 1a.

The projections 36 are provided on the sides of the bracket members 26, 27a facing away from one another.

In the embodiment according to FIGS. 8 through 10, the receptacles at the free ends of the pivot brackets of the mirror base 1b are embodied as guide sockets. In FIGS. 8 through 10, only one of the pivot brackets 5b of the mirror base 1b is illustrated. As in the preceding embodiments, the pivot brackets are again provided in pairs and are successively positioned in the travel direction F of the vehicle at a spacing to one another. The pivot brackets are identically embodied with respect to the configuration of the receptacles. The receptacle 7b has a bottom 35b ascending counter to the travel direction F. It has a curved transition at both its ends into end faces 38, 39 which delimit the receptacle 7b in and counter to the travel direction F. The bracket member 27b of the mirror head 2b engages the receptacle 7b.

As illustrated in FIG. 9, the width of the receptacle 7b, measured transversely to the travel direction F, approximately matches the width of the bracket member 27b. This ensures that the bracket member 27b is guided transversely to the pivot direction of the mirror head 2b in the receptacle. The bracket member 27b is curved with a part-circular shape at its free end (FIGS. 8 and 10).

In the position of use of the mirror head 2b (FIGS. 8 and 9), the bracket members 27b rests against the transition from the bottom 35b to the end face 39 of the pivot brackets 5b. When the mirror head 2b is forwardly folded in the travel direction F, for example, as a result of an impact onto the mirror head, it pivots forwardly counter to the force of the tension spring 29 (FIGS. 2 to 4) in the travel direction F, wherein the bracket members of the mirror head positioned to the rear relative to the travel direction will disengage the corresponding pivot brackets of the mirror base 1b, as has been described in detail in connection with FIGS. 1 through 4. During the pivot movement, the bracket members 27b glide along the bottom 35b of the receptacles 7b in the upward direction so that the mirror head 2b will carry out the stroke 32 (FIG. 10). This has the results that the cover of the mirror head 2b is moved away from the mirror head 1b by this stroke 32 during the pivot movement. Accordingly, a damage to the cover of the mirror head during this folding action is reliably prevented. In the folded position, the bracket members 27b of the mirror head 2b rest against the transition from the bottom 35b to the end face 38 of the receptacles 7b (FIG. 10). This transition area, like the other transition area, has the same radius of curvature as the end face of the bracket members 27b. This ensures that the bracket members 27b in the position of use (FIGS. 8 and 9) as well as in the pivoted position (FIG. 10) are supported areally in the receptacles 7b.

As soon as the force action on the mirror head 2b ceases, the mirror head pivots back into the position of use according to FIGS. 8 and 9 under the force of the tension spring 29. During the pivot movement the bracket members 27b again glide back along the bottom 35b of the receptacles 7b until the bracket members 27b with their end faces rests against the transition area of the bottom 35b to the end face 39 of the receptacles 7b (FIGS. 8 and 9). The mirror carrier with the mirror head 2b is thus moved again by the stroke 32 in the direction toward the mirror base 1. At the same time, the oppositely positioned bracket members (not illustrated) of the mirror support of the mirror head 2b are moved into the receptacles 7b of the pivot brackets 5 of the mirror base 1b.

When in the reverse direction the mirror head 2b is folded counter to the travel direction F into the parking position, the bracket members 26, as described in connection with FIGS. 1 through 4, are moved into the receptacles 6 of the pivot brackets 4. Since these receptacles have a bottom which ascends in the travel direction F, the bracket members are moved along this ascending bottom during the pivot movement so that the mirror carrier and thus the mirror head 2b are moved by the stroke 34 (FIG. 4) away from the mirror base 1b. The bracket members 27b become disengaged from the receptacles 7b.

When the mirror head 2b is moved from the parking position back into the position of use, the bracket members 26 of the mirror head 2b are moved back along the bottom of the receptacles 6 so that the mirror head 2b approaches the mirror base 1b by the stroke 34 (FIG. 4). The bracket members 27b reach again the receptacles 7b.

In other respects, the exterior rearview mirror according to FIGS. 5 through 10 are of a configuration identical to that of the embodiment according to FIGS. 1 through 4.

As a result of the pivot brackets 4, 5, 5a, 5b, an intermediate joint for a pivotal support of the mirror head 2, 2a, 2b in both pivot directions is not required. This provides a constructively simple configuration of the exterior rearview mirror. Moreover, as a result of this configuration a simplified assembly is achieved which is cost-reducing for the manufacture of the exterior rearview mirror.

While specific embodiments of the invention have been shown and described in detail to illustrate the inventive principles, it will be understood that the invention may be embodied otherwise without departing from such principles.

What is claimed is:

1. An exterior rearview mirror for vehicles, said exterior rearview mirror comprising:

a mirror base (1, 1a, 1b);

a mirror head (2, 2a, 2b) connected to said mirror base (1, 1a, 1b) so as to be pivotable in a travel direction (F) of the vehicle and in a direction opposite to the travel direction (F);

wherein said mirror base (1, 1a, 1b) has first and second bearings (6, 7, 7a, 7b) and wherein said mirror head (2, 2a, 2b) has first and second bearing elements (21, 22, 27a, 27b) engaging said first and second bearings (6, 7, 7a, 7b), respectively;

wherein said first and second bearing elements (21, 22, 27a, 27b) are configured such that, when said mirror head (2, 2a, 2b) pivots in the travel direction, said first bearing elements disengage said first bearings and said second bearing elements form a pivot axis within said second bearings and, when said mirror head (2, 2a, 2b) pivots in the direction opposite the travel direction, said second bearing elements disengage said second bearings and said first bearing elements form a pivot axis within said first bearings.

2. The exterior rearview mirror according to claim 1, comprising pivot brackets (4, 5, 5a, 5b), wherein said first and second bearings (6, 7, 7a, 7b) are provided on said pivot brackets (4, 5, 5a, 5b).

3. The exterior rearview mirror according to claim 2, wherein said pivot brackets (4, 5, 5a, 5b) are arranged on said mirror base (1, 1a, 1b).

4. The exterior rearview mirror according to claim 3, wherein said pivot brackets (4, 5, 5a, 5b) and said mirror base (1, 1a, 1b) are a monolithic part.

5. The exterior rearview mirror according to claim 2, wherein said mirror base (2) has a mirror base plate (3) and wherein said pivot brackets (4, 5, 5a, 5b) project transversely from said mirror base plate (3).

6. The exterior rearview mirror according to claim 2, wherein said pivot brackets (4, 5, 5a, 5b) have free ends and wherein said first and second bearings (6, 7, 7a, 7) are connected to said free ends of said pivot brackets (4, 5, 5a, 5b).

7. The exterior rearview mirror according to claim 6, wherein said first and second bearings (6, 7, 7a, 7b) are receptacles provided on said free ends of said pivot brackets (4, 5, 5a, 5b).

8. The exterior rearview mirror according to claim 7, wherein said first and second bearing elements (21, 22) are axles.

9. The exterior rearview mirror according to claim 7, comprising bracket members (26, 27) having free ends, wherein said first and second bearing elements (21, 22) are provided on said free ends of said bracket members (26, 27).

10. The exterior rearview mirror according to claim 9, wherein said mirror head (2) comprises a mirror carrier (23), wherein said bracket members (26, 27) are arranged on said mirror carrier (23) and project from said mirror carrier (23) toward said mirror base (1).

11. The exterior rearview mirror according to claim 10, wherein said bracket members (27a, 27b) form said first and second bearing elements.

12. The exterior rearview mirror according to claim 7, wherein said receptacles (6, 7, 7a, 7b) are bearing openings for said first and second bearing elements (21, 22, 27a, 27b).

13. The exterior rearview mirror according to claim 1, wherein said first and second bearings (6, 7, 7a, 7b) are oriented at a slant in the travel direction and in the direction opposite the travel direction, respectively.

14. The exterior rearview mirror according to claim 1, wherein said mirror head (2, 2a, 2b) carries out a stroke (32, 34) away from said mirror base (1,1 a, 1 b) when being pivoted in at least one of the travel direction (F) and the direction opposite the travel direction.

15. The exterior rearview mirror according to claim 14, wherein said first and second bearing elements (21, 22, 27a, 27b) are configured to be slidable in said first and second bearings (6, 7, 7a, 7b), respectively, when said mirror head (2, 2a, 2b) is pivoted.

16. The exterior rearview mirror according to claim 1, wherein said first and second bearings (6, 7, 7a, 7b) have an insertion opening (14, 20).

17. The exterior rearview mirror according to claim 16, wherein said insertion opening (14, 20) narrows in a direction toward said first and second bearings (6, 7, 7a, 7b), respectively.

18. The exterior rearview mirror according to claim 16, wherein said first and second bearings (6, 7) have a nose (11, 17) partially covering a length of said first and second bearings (6, 7), respectively.

19. The exterior rearview mirror according to claim 14, comprising pivot brackets (4, 5, 5a, 5b) having free ends, wherein said first and second bearings (6, 7, 7a, 7) are connected to said free ends of said pivot brackets (4, 5, 5a, 5b), wherein said first and second bearings (6, 7, 7a, 7b) are receptacles provided on said free ends of said pivot brackets (4, 5, 5a, 5b) and said receptacles (7a) are spherical sockets.

20. The exterior rearview mirror according to claim 19, wherein said first and second elements (27a) have a spherical end engaging said receptacles (7a), respectively.

21. The exterior rearview mirror according to claim 20, wherein said first and second bearing elements (27a) have at least one lifting element (36) configured to realize said stroke of said mirror head (2a).

22. The exterior rearview mirror according to claim 21, wherein said mirror base (1a) has a counter surface configured to cooperate with said at least one lifting element (36).

23. The exterior rearview mirror according to claim 14, comprising pivot brackets (4, 5, 5a, 5b) having free ends, wherein said first and second bearings (6, 7, 7a, 7) are connected to said free ends of said pivot brackets (4, 5, 5a, 5b), wherein said first and second bearings (6, 7, 7a, 7b) are receptacles provided on said free ends of said pivot brackets (4, 5, 5a, 5b) and said receptacles (7b) are guide sockets.

24. The exterior rearview mirror according to claim 23, wherein said receptacles (7, 7b) have a bottom positioned at a slant relative to the travel direction, wherein said bottoms are slanted oppositely to one another.

25. The exterior rearview mirror according to claim 24, wherein said slant of said bottoms defines said stroke of said mirror head (2, 2b).

* * * * *